March 7, 1944.   G. TICHAUER   2,343,821
PLANIMETER
Filed Oct. 6, 1942   6 Sheets-Sheet 1

INVENTOR:
GERHARD TICHAUER
BY Haseltine Lake & Co. ATTORNEYS

March 7, 1944. G. TICHAUER 2,343,821
PLANIMETER
Filed Oct. 6, 1942 6 Sheets-Sheet 2
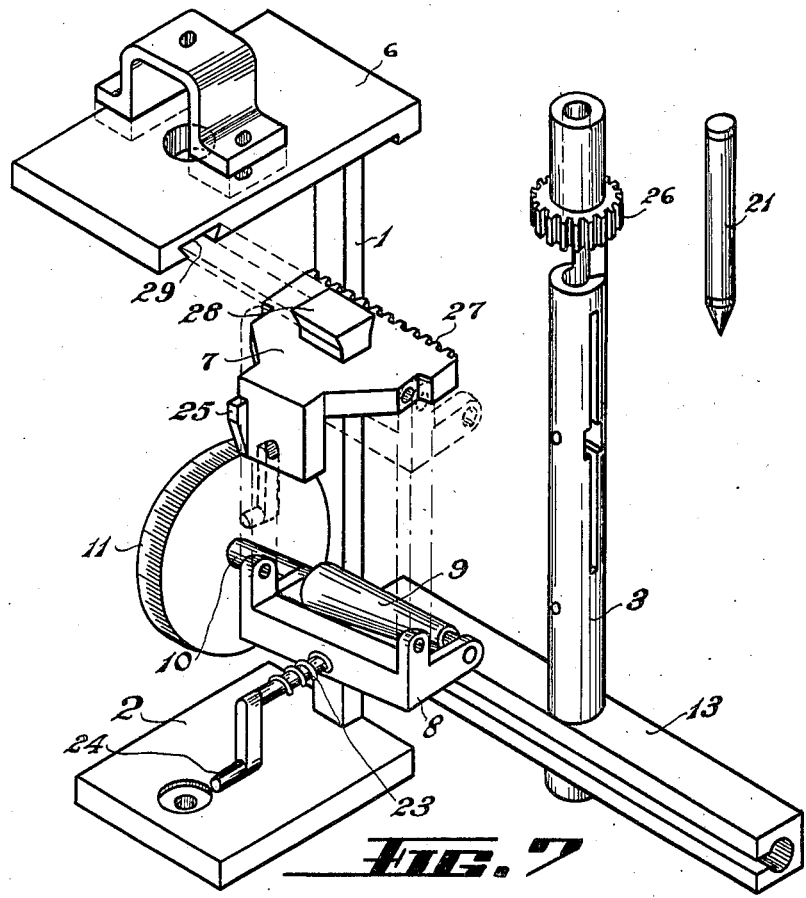
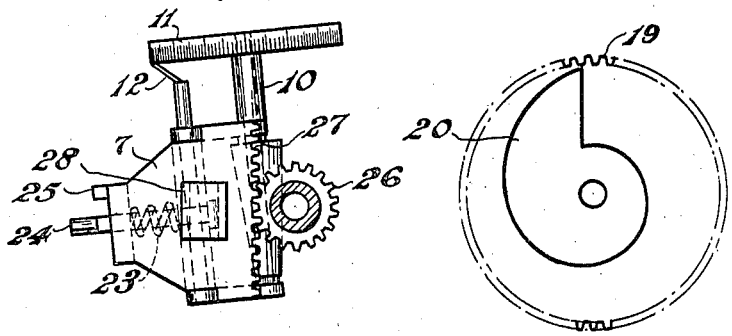
INVENTOR:
GERHARD TICHAUER
BY Haseltine Lake & Co.
ATTORNEYS.

March 7, 1944.   G. TICHAUER   2,343,821
PLANIMETER
Filed Oct. 6, 1942   6 Sheets-Sheet 3

INVENTOR:
GERHARD TICHAUER
BY Haseltine, Lake & Co.
ATTORNEYS.

INVENTOR:
GERHARD TICHAUER
BY Haseltine, Lake & Co. ATTORNEYS.

INVENTOR:
GERHARD TICHAUER
BY Haseltine, Lake & Co.
ATTORNEYS.

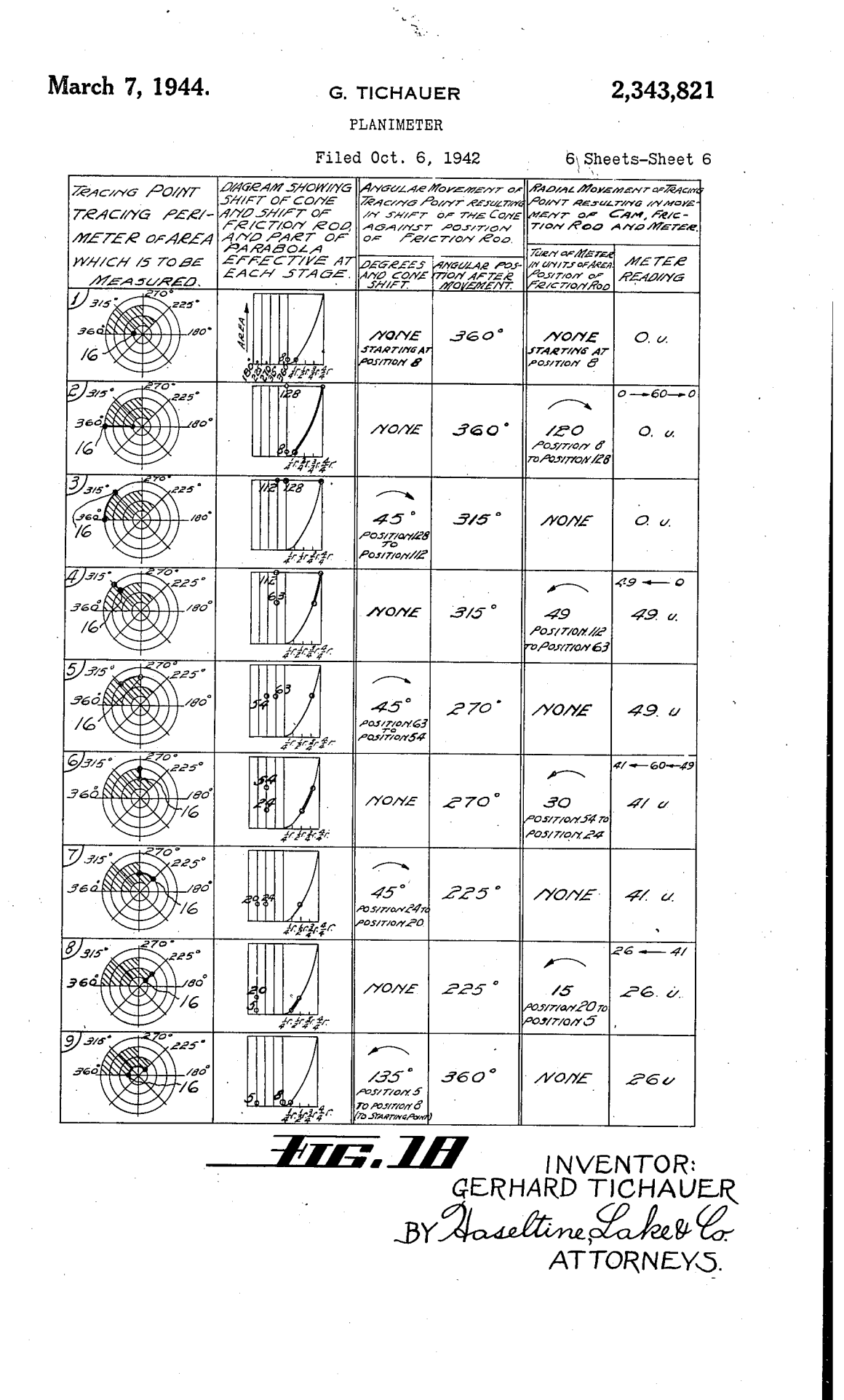

March 7, 1944. G. TICHAUER 2,343,821

PLANIMETER

Filed Oct. 6, 1942  6 Sheets-Sheet 6

| TRACING POINT TRACING PERIMETER OF AREA WHICH IS TO BE MEASURED. | DIAGRAM SHOWING SHIFT OF CONE AND SHIFT OF FRICTION ROD AND PART OF PARABOLA EFFECTIVE AT EACH STAGE. | ANGULAR MOVEMENT OF TRACING POINT RESULTING IN SHIFT OF THE CONE AGAINST POSITION OF FRICTION ROD. | | RADIAL MOVEMENT OF TRACING POINT RESULTING IN MOVEMENT OF CAM, FRICTION ROD AND METER. | |
|---|---|---|---|---|---|
| | | DEGREES AND CONE SHIFT. | ANGULAR POSITION AFTER MOVEMENT. | TURN OF METER IN UNITS OF AREA POSITION OF FRICTION ROD | METER READING |
| 1) | | NONE STARTING AT POSITION 8 | 360° | NONE STARTING AT POSITION 8 | O. u. |
| 2) | | NONE | 360° | 0→60→0 120 POSITION 8 TO POSITION 128 | O. u. |
| 3) | | 45° POSITION 128 TO POSITION 112 | 315° | NONE | O. u. |
| 4) | | NONE | 315° | 49←0 49 POSITION 112 TO POSITION 63 | 49. u. |
| 5) | | 45° POSITION 63 TO POSITION 54 | 270° | NONE | 49. u |
| 6) | | NONE | 270° | 41←60←49 30 POSITION 54 TO POSITION 24 | 41 u |
| 7) | | 45° POSITION 24 TO POSITION 20 | 225° | NONE | 41. u. |
| 8) | | NONE | 225° | 26←41 15 POSITION 20 TO POSITION 5 | 26. u. |
| 9) | | 135° POSITION 5 TO POSITION 8 (TO STARTING POINT) | 360° | NONE | 26 u |

FIG. 18

INVENTOR:
GERHARD TICHAUER
BY Haseltine, Lake & Co.
ATTORNEYS.

UNITED STATES PATENT OFFICE 2,343,821

PLANIMETER

Gerhard Tichauer, Oranjezicht, Cape Town, Cape Province, Union of South Africa

Application October 6, 1942, Serial No. 460,941. In the Union of South Africa November 27, 1941

9 Claims. (Cl. 33—122)

This invention relates to an improved planimeter which is an instrument used for mechanically measuring areas, and which is more particularly applicable for the purpose of measuring directly the areas of flat irregular figures such as maps, indicator diagrams and the like.

A known type of instrument used for this purpose consists essentially of two arms pivotally connected together. The free end of one arm is pivotally secured to the table or the like adjacent the area to be measured, while the other arm, carries a tracing point and a metering wheel, which is graduated directly in square measure such as square inches, and is usually provided with a vernier for accurate reading. In this known type of instrument the metering wheel must be kept in contact with the surface of the map drawing or the like during the whole operation. The principle of operation is based on the formula for the area of a rectangle, that is, area=length (of tracing arm)×breadth (perimeter of metering wheel). More specifically: area=$2\pi r l n$ where $r$=radius of wheel; $l$=length of tracing arm and $n$=number of revolutions made by the wheel.

The essential difference between this older type of planimeter and the present invention, is that in the present case a single tracing point is the only part of the instrument which is required to make contact with or trace the outline of the area to be measured, such as a map, diagram, or the like.

According to the invention, broadly, the improved planimeter consists of quadrating means arranged to translate the radial movements of a single stylus-like tracing point attached to a horizontally pivotable tracing arm, into motion of quadrated character: means for transmitting this quadrated motion to a direct reading area-metering device; and means for co-ordinating the ratio between the quadrated motion and the area-registering movement of the area-metering device, according to the angular position or angular movements of the tracing point about a vertical polar axis of the instrument, the arrangement being such that the metering device indicates directly in units of square measure the size of an area on the outline thereof being traced by the tracing point. The improved instrument operates on the principle according to which radial movements of the tracing point representing radial distances from the polar axis, are translated into values representing the areas of circles with radii corresponding to these radial distances, while the co-ordinating means causes these values to be varied in direct proportion to the angular position of the tracing point with respect to a starting position, thereby enabling the areas of sectors or circles, corresponding to the arcs subtended by varying angles included between a radial line joining the tracing point to the polar axis and a radial line representing said starting position, as well as areas of full circles, to be indicated on the metering device.

More specifically the operation of the instrument is beased on two mathematical results, namely:

(a) The area of a circle is a function of the square of its radius, i. e.

$$\text{Area}_1 = \pi r_1^2$$
$$\text{Area}_2 = \pi r_2^2$$

whence $$\frac{\text{Area}_1}{\text{Area}_2} = \frac{r_1^2}{r_2^2}$$

(Hence the use of the quadrating means.)

(b) The ratio of the area of sectors of a circle is proportional to the ratio of their arcs, i. e.

$$\frac{\text{Area}_1}{\text{Area}_2} = \frac{\text{Arc}_1}{\text{Arc}_2}$$

(Hence the use of the co-ordinating means.)

The preferred means for transmitting the quadrated motion to the metering device consists of an axially movable friction rod adapted to cause rotation of the metering device by frictional contact with the periphery of a co-acting friction drive member connected to the metering device. According to the preferred construction the co-ordinating device consists of a bodily movable conical friction roller which is interposed between the friction rod and the metering device. This roller is arranged so that the gear ratio between the axially movable friction rod and the metering device is varied automatically according to the angular positions of the tracing point about the polar axis, by a shifting movement of said friction roller with respect to the friction rod, the axes of the roller and friction rod being at right angles to one another. In this construction the quadrating device consists of a spirally contoured cam co-acting with the friction rod to cause axial movement thereof, the cam being rotated by the radial movements of the tracing point through a rack on the tracing arm and an interposed gear train.

In this preferred construction of the instrument the horizontal tracing arm and the mechanism for translating the radial movements of the tracing point into motion of quadrated character, are carried by a vertical spindle mounted in a frame between top and bottom bearings for pivoting movement about a vertical axis constituting the polar axis of the instrument. The arrangement is such that while the tracing arm is slidably mounted for radial movement in guiding means adjacent the lower end of the spindle, angular movement of the tracing arm about the polar axis rotates the spindle, and the rotational motion is employed to vary the gear ratio of the motion transmitted from the quadrating means to the metering device.

To enable the foregoing result to be obtained, the conical friction roller is carried by a sliding block co-acting with guiding means on the headpiece of the frame, and a gear pinion keyed to the vertical spindle adjacent the top end thereof, co-acts in meshing engagement with a rack on the block, whereby the conical roller is automatically shifted to vary the gear ratio, according to angular movements of the tracing arm about the polar axis. The conical friction roller is journalled in a swing plate which is pivotally connected to the sliding block, and spring means co-acting therewith are so arranged that they tend to press the roller into frictional contact with the friction rod. Means are also provided for withdrawing this swing plate to cause disengagement of the roller with the friction rod, for purposes of enabling the tracing point to be moved without disturbing a reading on the metering device, and to permit of the setting thereof to the zero position before commencing to operate the instrument.

The metering device is in the form of a graduated wheel or disc, and is fixed to an extension of the shaft of the conical friction roller for rotation with respect to a stationary pointer projecting from the sliding block. This area-indicating wheel or disc is similarly graduated in units of area around its periphery or edge in both directions from a zero mark thereon. This is done to enable tracing of an area to take place in either a clockwise or an anti-clockwise direction, and to enable traced areas to be added to or subtracted from one another so that the final reading gives the result. To enable the conical friction roller to engage with the friction rod in all positions of the sliding block, it will be understood that its path of movement and consequently the pitch line of its rack are arranged to be parallel with the sloping surface of the roller itself.

In the construction above described the axis of the main vertical spindle intersects the horizontal axis of the slotted guide carrying the tracing arm, and angular movement, due to the obstruction caused by the vertical pillar of the frame, is limited to somewhat less than 180 degrees. By constructing the instrument in such a way that the axis of the aforesaid guide and axis of the main vertical spindle do not intersect, that is, by shifting the guide away from the vertical axis and fastening it at the side of the vertical spindle, the angular movement of the tracing arm around the polar axis can be increased to an amount equal to or even greater than 180 degrees.

In another alternative construction, by substituting a base and a vertical pole shaft projecting upwardly therefrom, for the aforesaid frame, and by mounting two concentric cylinders around the pole shaft, in substitution for the main vertical spindle and the friction rod respectively, and by securing the gears and the quadrating device outside on the concentric cylinder taking the place of the main vertical spindle, it is possible for the tracing arm to describe a complete circular movement of 360 degrees about the polar axis.

To enable the invention to be more clearly understood and carried into practice, reference is now made to the accompanying drawings in which like references denote like parts throughout the several views.

In the drawings:

Fig. 7 is an "exploded" view showing the main parts of the instrument separated from one another.

Fig. 8 is an enlarged sectional plan view showing the sliding block carrying the conical friction roller and metering wheel.

Fig. 9 is an enlarged view of the quadrating cam in relation to its gear wheel.

Fig. 18 is an explanation in tubular form of the practical use of the instrument in measuring an actual area.

Figure 1:
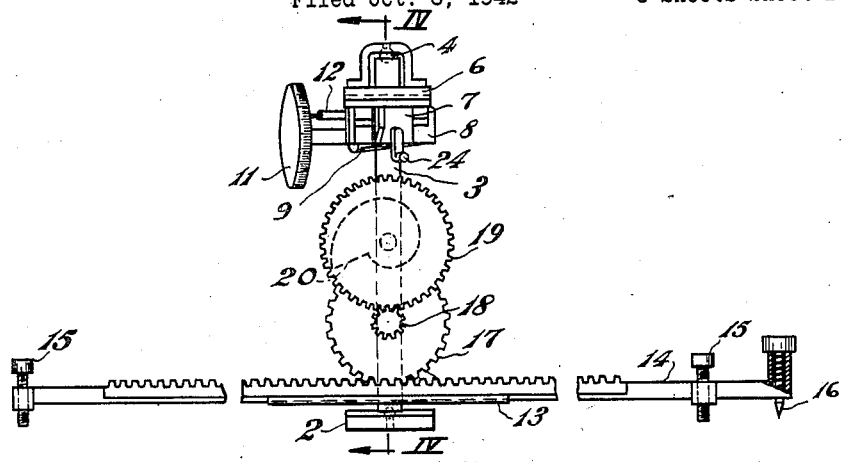
Fig. 1 is a front elevation of a planimeter constructed according to the invention.

Referring to the drawings, reference 1 denotes a rigid frame adapted to stand on a flat surface by means of its base 2. Certain of the operative parts of the instrument are mounted on the main vertical spindle 3 which is rotatably located by top and bottom bearings 4 and 5 respectively. The head piece 6 of the frame 1 carries the sliding block 7 to which is pivotally secured the swing plate 8 carrying the conical friction roller 9, to an extension of the shaft 10, of which is keyed the metering or area-indicating wheel 11 which rotates past a stationary indicating pointer or vernier 12.

Figures 2, 3, 4:
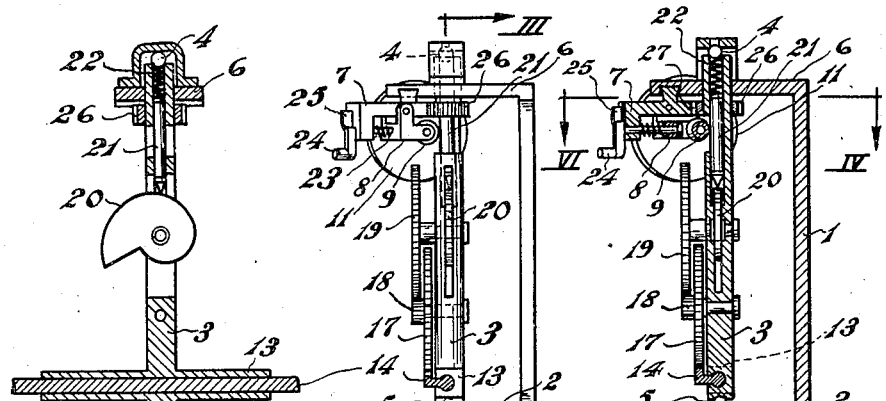
Fig. 2 is a part-sectional end view taken from the right hand side of Fig. 1.
Fig. 3 is a vertical section taken on line III—III of Fig. 2.
Fig. 4 is a vertical section taken on line IV—IV of Fig. 1.

The lower end of the vertical spindle 3 is formed integrally with, or is rigidly fixed to, a transverse slotted guide 13 adapted to receive the radially slidable tracing arm 14 provided with adjustable supporting pins 15 and a spring-mounted tracing point or stylus 16. The tracing arm 14 has a toothed rack secured to one side thereof which is in permanent meshing engagement with a gear wheel 17. The rotary motion imparted to the gear wheel 17 by radial movements of the tracing arm 14, is transmitted by way of the gear pinion 18 and second gear wheel 19, to the cam 20, the contour of which is of substantially spiral form. This cam 20 is, as shown, mounted in a slot in the spindle 3 and co-acts with the lower end of the vertically slidable friction rod 21 which is held in contact with the periphery thereof by a small compression spring 22 co-acting with the top end of said friction rod. The side of the top hollow portion of the spindle 3 facing the conical friction roller 9, is cut away as clearly shown in Figs. 2, 4 and 7, to allow frictional contact between the friction rod 21 and the friction roller 9, which is resiliently pressed thereagainst by means of the small compression spring 23 threaded over the spindle of the disengaging handle 24 which co-acts with the wedge stop 25 to cause disengagement between these two parts when required.

The upper end of the spindle 3 has a small gear pinion 26 keyed to it so as to be in constant meshing engagement with a rack 27 provided along the edge of the sliding block 7. This sliding block 7 is provided with a dovetailed slider 28 on its top side which co-acts slidably in a correspondingly shaped guide slot 29 in the underside of the headpiece 6, the longitudinal axis of which slot is arranged parallel with the face of the conical friction roller 9 (see Fig. 8) so that horizontal movement of the sliding block 7 will not interfere with the maintenance of frictional contact between said roller and the friction rod 21 which is in fact free to rotate about its own axis.

Figures 5, 6:
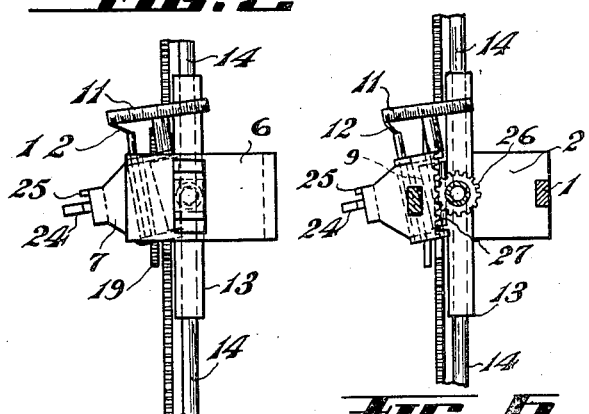
Fig. 5 is a shortened plan view taken on Fig. 1.
Fig. 6 is a sectional plan view taken on line VI—VI of Fig. 4.

More particularly, to enable the conical friction roller 9 to engage in constant frictional contact with the friction rod 21 in all positions of the sliding block 7, its path of shifting movement and consequently the pitch line of its rack 27, are arranged to be parallel with the longitudinal sloping face of the roller 9 as shown in Figs. 5 and 8. To achieve this result it will be noted that the guide slot 28 extends obliquely across the head piece 6, so that, on shifting, the roller 9 moves in a path parallel with its longitudinally sloping face.

To enable the operation or use of the instrument to be understood it is assumed in the following description for the sake of simplicity that:

(a) Maximum distance of tracing point from polar axis$=r$
(b) Minimum distance of tracing point from polar axis$=\frac{1}{4}r$
(c) An area of $\frac{1}{16}\pi r^2 = 8u$ (units of area), where area of maximum circle measurable $=128u$.

The principle of operation of the instrument is based on two results, namely:

$$\text{Area of a circle} = \pi r^2$$

or algebraically $$y = ax^2 \quad (1)$$

The areas of the sectors of a circle are proportional to the ratio of their arcs, that is $$\frac{\text{Area}_1}{\text{Area}_2} = \frac{\text{Arc}_1}{\text{Arc}_2} \quad (2)$$

Figure 12:
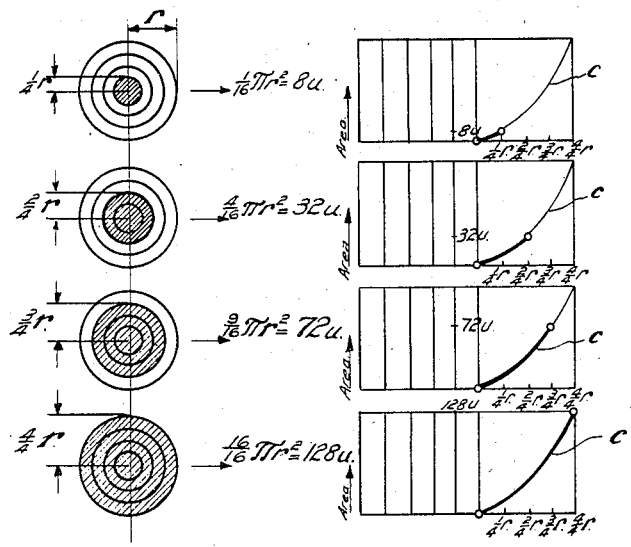
Fig. 12 is a diagrammatic example illustrating theoretical principle of operation of the instrument for measuring full circles.
Figure 13:
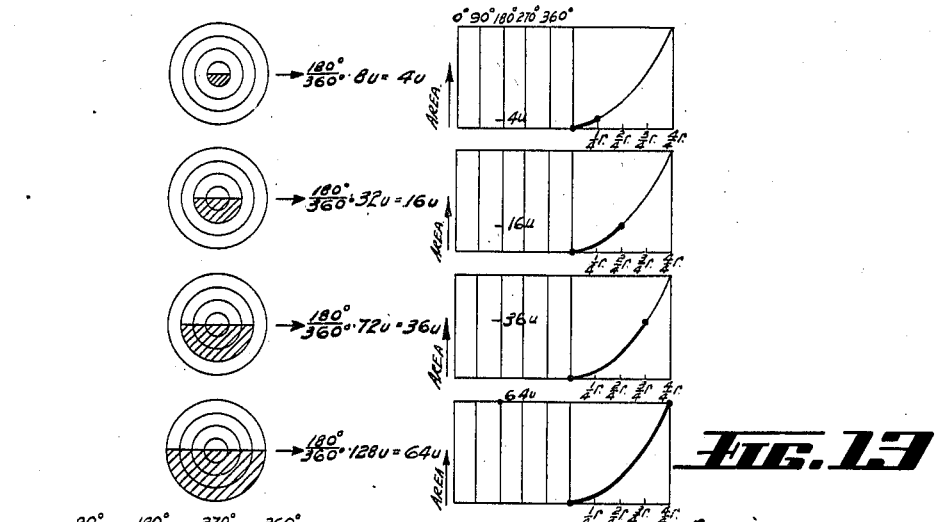
Fig. 13 is a similar example showing measurement of semi-circular areas.
Figure 14:
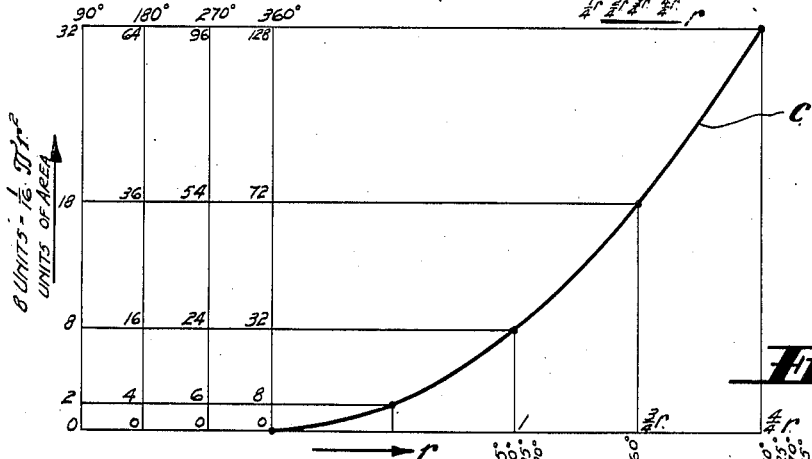
Fig. 14 is a graph illustrating the relationship between radii and the corresponding areas.

By plotting the Equation 1 for different values of $r$, a parabolic curve C gives the corresponding areas as shown in Fig. 14. The vertical ordinates are marked with the actual units of area assumed above. The instrument is so constructed and calibrated that pure radial movements of the tracing point 16 are translated directly into corresponding units of area by means of a suitably graduated area indicating device such as the wheel 11. This translation of values is effected by means of the quadrating cam 20, the spiral contour of which is designed to maintain the correct relationship between any values from 0 to $r$ and their corresponding areas, so that any distance which the tracing point 16 takes up along a radial line from the polar axis, results in the wheel 11 indicating the area of a circle corresponding to that particular radius. To make this description clearer, reference is made to Fig. 12 in which four shaded areas to be measured are shown as fractions of $\pi r^2$. In the first or top one the area is that of a circle of $\frac{1}{4}r$ radius which, as previously described, corresponds to $8u$. The movement of the tracing point 16 from the polar axis or zero position to a position corresponding to a radius of $1\frac{1}{4}r$, is shown by the short thick portion of the curve C in the small graph on the right. This movement results in the wheel 11 being rotated, by means of the rack on the arm 14, gears 17, 18 and 19, cam 20, friction rod 21 and conical roller 9, to indicate a reading of $8u$ thereon. Similarly the remaining graphs show the movements of the tracing point 16 for the areas corresponding to circles of radius of $\frac{2}{4}r$, $\frac{3}{4}r$ or $\frac{4}{4}r$. In each case the area is read off on the ordinate headed by 360 degrees since the areas concerned are of full circles. In these four cases the friction rod 21 is in its extreme end position with respect to the conical roller 9 and is at the small end thereof, so as to transmit the maximum rotational movement thereto. To measure the semi-circular areas shown in Fig. 13, the friction rod 21 is at its mid point with respect to the conical roller so that for the same radial movement of the tracing point 16, the wheel 11 is only rotated to half the extent which it was rotated when measuring the areas of Fig. 12. In the graphs of Fig. 13 it will accordingly be noted that the areas are read off on the ordinate directly under 180 degrees which represents the degrees moved through by the radius in describing a semi-circle. In a similar manner sectors of various sizes are measured by the radial movement of the tracing point 16.

Figure 15:
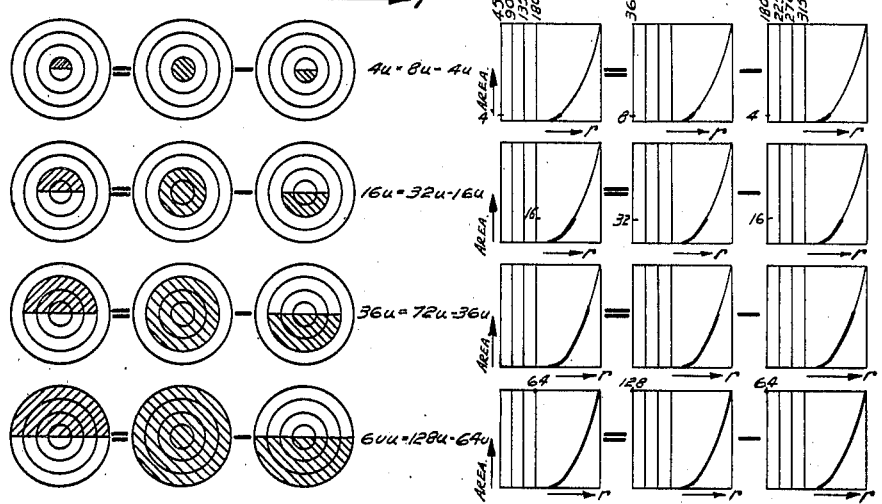
Fig. 15 is a diagrammatic example illustrating the application of the theoretical principle to practical operation of the instrument.

In actual practice the instrument is so constructed and calibrated that the final area indicated on the wheel 11 is in fact the result of the subtraction of one area from another, as more clearly explained by Fig. 15. In tracing the areas shown by the shaded portions in the concentric circles on the left hand side of the figure, the tracing point 16, commencing from the centre, which represents the polar axis of the instrument, first moves to the left in an outward radial direction. This movement causes the wheel 11 to be rotated to indicate the area of a full circle corresponding to the radial distance travelled by the tracing point, that is, the shaded areas respectively in the middle row of concentric circles. The second movement of the tracing point is around the arc of the circle enclosing the shaded area. This angular movement from the position indicated by 360 degrees to that indicated by 180 degrees (see small graphs), causes the spindle 3 to rotate whereby the gear 26 moves the rack 27, and consequently the conical roller 9, to a position where the friction rod 21 engages with it midway between its ends. This angular movement does not affect the reading on the wheel 11 which still shows the area of the full circle. The third movement of the tracing point to the left, back to the centre, causes reverse rotation of the conical roller 9 and the wheel 11, to indicate a reading which is in fact the result of the subtraction of two areas. In other words, the first or outward radial movement of the tracing point indicates the area of a full circle, while the second or inward radial movement causes the wheel 11 to be rotated backwards an amount equivalent to the area of a semi-circle, so that the actual final reading is in fact that of the area actually traced. The conical roller is of course proportioned in such a way that the circumference at the small end or zero position of the friction rod, is half that at the middle thereof. In the same way the areas of annuli or portions of annuli are obtained.

It is to be understood that the foregoing description is substantially a theoretical explanation of the principles on which the instrument operates and has assumed that the tracing point 16 is capable of making a complete revolution about the polar axis of the machine, that is moving through an angular distance of 360 degrees. Although the invention includes an instrument of this range, for most practical purposes such a range is not necessary. The instrument illustrated in the accompanying drawings has, for various reasons which will be explained, a range of under 180 degrees.

Figure 10:
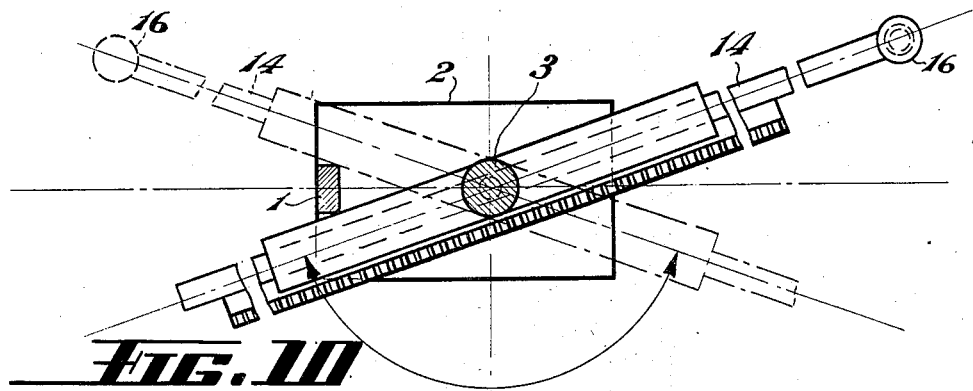
Fig. 10 is a shortened sectional plan view to an enlarged scale showing maximum permissible angular movement of the tracing arm.
Figure 11:
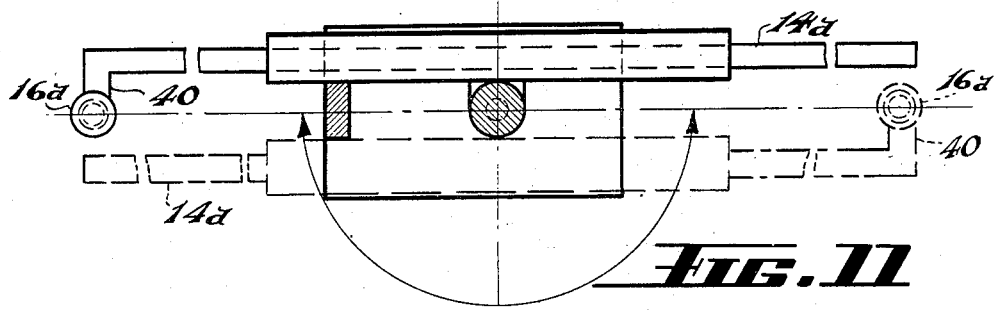
Fig. 11 is a similar view showing a modified arrangement to give a range of 180 degrees.
Figure 16:
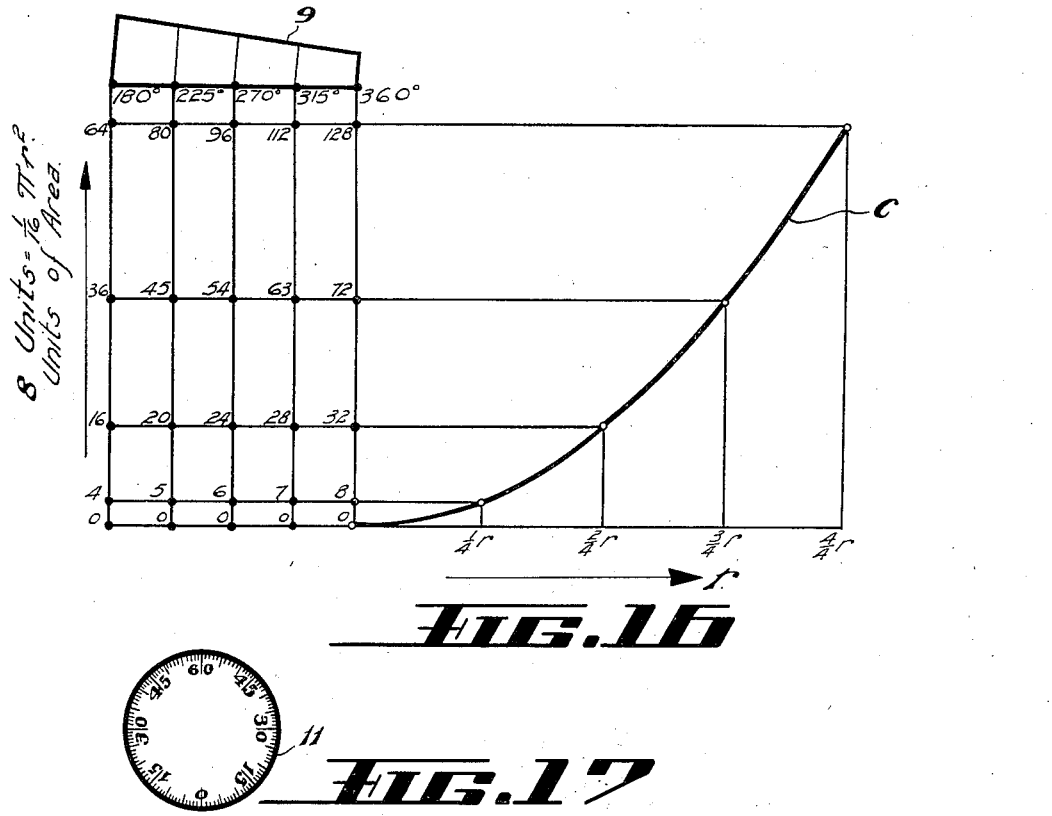
Fig. 16 is a graph illustrating method of proportioning the conical roller.

Reference is accordingly now made to Figs. 10 and 11. Fig. 10 is a shortened plan view of the tracing arm and base of the instrument illustrated in the drawings. It will be seen that, due to the obstruction caused by the vertical post of the frame 1, the tracing arm 14 is capable of an angular movement which is substantially less than 180 degrees. Fig. 11 illustrates a slightly modified construction which does in fact give a range of 180 degrees. In this case the tracing arm 14a is offset with respect to the polar axis, and the tracing point 16a is mounted on a short arm 40 so as to bring it into line with a radial line drawn through the polar axis. As previously described the minimum distance which the tracing point 16 can take up from the polar axis, which is of course the vertical axis of the spindle 3, is $\frac{1}{4}r$ and the maximum distance is $r$. It will be understood that for practical considerations the tracing point 16 cannot start from the polar axis or a zero position. In designing the conical roller 9 it is assumed that the instrument has a range of 180 degrees. On this assumption the maximum area measurable is:

$$(\pi r^2 - \tfrac{1}{16}\pi r^2)\,\frac{180}{360} \text{ or } \frac{15}{16}\pi r^2 \times \tfrac{1}{2}$$

substituting $\tfrac{1}{16}\pi r^2 = 8u$
Maxium area $= 120u \times \tfrac{1}{2} = 60u$ Fig. 16 is a graph showing how the conical roller 9 is proportioned. The circumference of the small end of the roller 9, indicated by 360 degrees, is such that one complete revolution thereof indicates on the wheel 11 and area of 120u, while the circumference of the large end indicated by 180 degrees, is just twice that of the small end.

The cam 20 is so shaped as regards its contour that the maximum vertical movement imparted by it to the friction rod 21 causes the rod when at the small end of the roller 9, to rotate it one complete revolution, and when at the large end, a similar vertical movement, will give only one half of a revolution of the roller 9. Any intermediate position of the rod 21 will give a proportional rotational movement which will be directly dependent upon the angular position of the tracing arm 14 about the polar axis.

In the graph of Fig. 16, the five vertical ordinates correspond to five different circumferences taken at equal distances along the axis of the conical roller 9, and represent the units of area indicated by vertical movement of the friction rod when in any of the positions shown by these ordinates. As before, these areas are obtained from the parabolic curve C.

Figure 17:
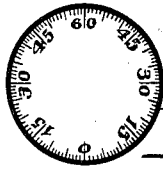
Fig. 17 is a front view of the graduated face of the area-indicating wheel or disc.

Fig. 17 shows the graduation of the wheel 11 so as to give readings in both directions of rotation and thereby to enable one indicated area to be added to or subtracted from another.

Reference is now made to Fig. 18 which shows in tabular form the step by step operation of the instrument in measuring the irregular area shown as hatched in the first column of the table. First of all the instrument is set up with its polar axis directly above and in line with the centre of the several concentric circles defining the area to be measured. Before commencing, the tracing arm is brought to the starting position in which the friction rod 21 is at its extreme position in engagement with the small end of the conical roller 9. In addition, the handle 24 is manipulated to enable the wheel 11 to be set to the zero mark thereon. The diagrams in column 2 are representations to a smaller scale of the graph shown in Fig. 16. The arrows thereon show the direction of movement of the friction rod 21, while the spaced ordinates indicate the relative positions of said rod with respect to its co-acting frictional engagement with the conical roller as it is moved bodily by angular movement of the tracing arm 14.

Since the tracing point 16 at the commencement of its tracing movement (see first figure in table) is in fact at a radial distance of $\frac{1}{4}r$ from the polar axis; theoretically this will correspond to an indication of 8u of area although the wheel 11 is in fact set at zero. This fact accounts for the curve commencing at a point corresponding to 8u and not at zero.

The first movement of the tracing point 16 is radially outwards as shown by the thick line in the second figure. Since the friction rod 21, at starting, is in frictional engagement with the small end of the conical roller 9, this radial movement results in maximum rotational movement of the cam 20, which, as previously described, results in maximum vertical movement of the friction rod 21 and consequent rotation of the conical roller 9 and wheel 11 to the extent of one complete revolution in a clockwise direction, that is, from zero to 60u and round to zero again, as indicated in columns 5 and 6. This measurement is represented in the graph as the length of the 360 degrees ordinate between 8u and 128u. The next movement of the tracing point is purely angular and is shown by the thick line in the third figure in the first column. This movement, by rotating the spindle 3 and gear 26, moves the conical roller 9 bodily with respect to the friction rod 21, to a position represented by the ordinate headed by 315 degrees. It will be noted that the reading on the wheel 11 is unaltered at zero.

The next movement of the tracing point is purely radial as indicated by the thick line in the fourth figure in the first column. This movement causes anti-clockwise rotation of the wheel 11 to a reading of 49u. Since the friction rod 21 is now in engagement with the conical roller 9 on a circumference represented by the ordinate headed 315 degrees, the downward vertical movement of the rod 21 is shown as taking place from 112 to 63 on this ordinate.

The next movement shown in the fifth figure in the first column, being purely angular, the area indicated remains unaltered. The conical roller 9, however, is moved again to bring the friction rod 21 opposite a circumference thereof represented by the ordinate headed 270 degrees, the corresponding unit value of which is shown as 54.

The next movement shown in the sixth figure in the first column, is now radial in an inward direction which thereby rotates the wheel 11 in an anti-clockwise direction to a reading of 41u on the other side of the 60u mark. The movement of the friction rod 21, which is again downwards is represented on the 270 degree ordinate by a move from 54 to 24.

The seventh figure in the first column shows the next movement which, being purely radial, does not disturb the reading on the wheel 11. The conical roller 9, however, is moved still further in the same direction to bring a larger circumference thereof in contact with the friction rod 21. This movement is shown on the graph in the second column as a move from the 270 degree ordinate to the ordinate headed 225 degrees, which position represents 20 units.

The next move shown in the eighth column is radial in an inward direction towards the polar axis, and consequently the wheel 11 is rotated in an anti-clockwise direction from 41u to 26u. At the same time the friction rod moves downwardly as shown by the move on the 225 degree ordinate from 20 to 5. The final movement of the tracing point back to the starting point is purely angular but in an anti-clockwise direction which thereby causes the conical roller 9 to move back to its position in which the small end thereof is in contact with the friction rod 21. The final reading on the wheel 11 is still 26u, which is in fact the area of the hatched portion of the figure in the first column.

Figures 19, 19A:
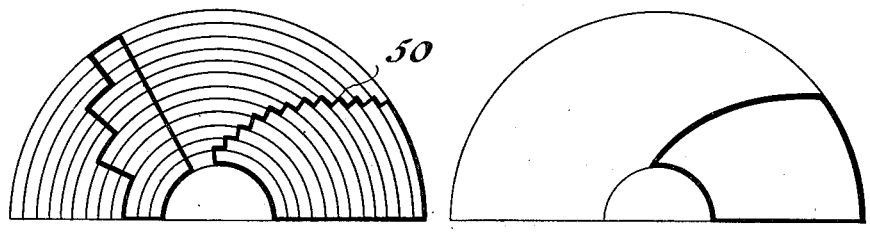
Figs. 19 and 19a are diagrams illustrating how the instrument is capable of measuring any irregular area.

The area measured as described with reference to Fig. 18 is, for simplicity in explaining the operation of the instrument, made up of a series of portions of radii and circumferences of circles as shown in Fig. 19. If the magnitudes of these portions are reduced until they are infinitesimal the stepped line 50 of Fig. 19 becomes the curve of Fig. 19a. It will accordingly be understood that the instrument is capable of measuring any regular or irregular area by merely tracing the outline thereof with the tracing point 16.

It is to be understood that the invention is not restricted to the actual quadrating device illustrated in the drawings, that is, the spirally contoured cam 20. For instance, the radial movements of the tracing point may be translated into movements of quadrated character, by the expedient of forming the tracing arm itself in the shape of the parabolic curve C so that its radial movements will transmit part rotational motion to a guide member in which the arm co-acts in a slidable manner.

What I claim is:

1. A device for measuring areas of plane surfaces comprising a frame having top and bottom portions, bearings disposed in said top and said bottom portions, a spindle vertically mounted in said frame between said bearings whereby said spindle is rotatable between said bearings and the vertical axis of said spindle coincides with the polar axis of said device, a stylus-like tracing point secured to a tracing arm, said tracing arm being slidably mounted in a guide attached to said spindle, a gear train attached to said spindle, a spirally contoured cam attached to said spindle, a slidable friction rod disposed within a bore formed in the top end of said spindle, the axis of said rod coinciding with said polar axis of said spindle, a gear pinion keyed to said spindle and disposed adjacent said top end thereof, guide means on said top portion of said frame, a block slidably mounted in said guide means, a metering device mounted on said block, a conical friction roller rotatably mounted on said block, the periphery of said conical roller being adapted to bear against the exterior surface of said rod, a gear rack carried by said tracing arm, said gear rack meshing with said gear train to produce rotation thereof upon radial movement of said tracing arm, said gear train being connected with said cam to produce rotation thereof, said friction rod having one of its ends in engagement with the periphery of said cam whereby movement of said rod is a function of the second degree, means disposed on said block cooperating with said pinion to move said block upon angular rotation of said tracing arm, an area registering device mounted on said block, said area registering device being operable upon rotation of said conical roller, whereby area registering operation of said area registering device is a quadratic function of the radial movements and a linear function of the angular movements of said tracing arm.

2. A device as defined in claim 1, said means cooperating with said gear pinion comprising a gear rack, whereby said conical roller is automatically shifted to vary the gear ratio upon angular movements of said tracing arm.

3. A device for measuring areas of plane surfaces as defined in claim 1, the axis of said guide means for said block being disposed parallel to the sloping face of said conical roller.

4. A device for measuring areas of plane surfaces as defined in claim 1, said conical roller being journalled in a swing plate pivotally connected to said sliding block, spring means coacting with said slidable block and said roller urging said roller into frictional contact with said rod, and means for withdrawing said swing plate to cause disengagement of said roller with said rod enabling the tracing point to be moved without disturbing a reading on said area metering device, and to permit the setting of said metering device to the zero position before commencing the operation of said device.

5. A device for measuring areas of plane surfaces as defined in claim 1, said conical roller being rigidly secured on a shaft and said shaft being rotatably mounted on said slidable block, said area registering device comprising a graduated disc concentrically mounted on said shaft, and a pointer fixedly secured to said slidable block.

6. A device for measuring areas of plane surfaces as defined in claim 1, said conical roller being rigidly secured on a shaft and said shaft being rotatably mounted on said slidable block, said area registering device comprising a graduated disc concentrically mounted on said shaft, said disc being graduated in units of area around its periphery or edge in both directions from a zero mark thereon, to enable tracing of an area to take place in either a clockwise or an anti-clockwise direction, and to enable traced areas to be added to or subtracted from one another so that the final reading gives the result, and a pointer fixedly secured to said slidable block.

7. A device for measuring areas of plane surfaces as defined in claim 1, said spindle having a slot formed therein, said cam being rotatably mounted on a substantially horizontal axis in said slot, and resilient means constantly acting to urge said rod into engagement with the periphery of said cam.

8. A device for measuring areas of plane surfaces as defined in claim 1, and bearing means for said rod whereby said rod may rotate about its axis on bodily movement of said roller.

9. A device for measuring areas of plane surfaces as defined in claim 1, said means cooperating with said gear pinion comprising a gear rack, the pitch line of said gear rack being parallel to the sloping face of said roller.

GERHARD TICHAUER.